(12) United States Patent
Usui et al.

(10) Patent No.: US 6,685,875 B2
(45) Date of Patent: Feb. 3, 2004

(54) FOAMED THERMOPLASTIC RESIN MOLDING AND PROCESS FOR PRODUCING THE SAME

(75) Inventors: Nobuhiro Usui, Takatsuki (JP); Takeo Kitayama, Ibaraki (JP)

(73) Assignee: Sumitomo Chemical Company, Ltd., Osaka (JP)

( * ) Notice: Subject to any disclaimer, the term of this patent is extended or adjusted under 35 U.S.C. 154(b) by 35 days.

(21) Appl. No.: 09/843,780

(22) Filed: Apr. 30, 2001

(65) Prior Publication Data

US 2001/0036971 A1 Nov. 1, 2001

(30) Foreign Application Priority Data

Apr. 28, 2000 (JP) ........................................ 2000-129382

(51) Int. Cl.[7] ............................................... B29C 51/10
(52) U.S. Cl. ........................ 264/554; 264/321; 264/553
(58) Field of Search ................................ 264/321, 553, 264/554

(56) References Cited

U.S. PATENT DOCUMENTS 4,036,675 A * 7/1977 Amberg et al. ............. 156/245
5,891,387 A * 4/1999 Rolle .......................... 264/554
6,203,751 B1 * 3/2001 Rolle et al. ................. 264/554

FOREIGN PATENT DOCUMENTS

| JP | 08011149 A | 7/1994 |
|----|------------|--------|
| JP | 08052795 A | 8/1994 |
| JP | 08229971 A | 2/1995 |

* cited by examiner

*Primary Examiner*—Allan R. Kuhns
(74) *Attorney, Agent, or Firm*—Fitch, Even, Tabin & Flannery

(57) ABSTRACT

The present invention relates to foamed thermoplastic resin moldings which can be used, for example, as food product containers which can contain retort food products, etc., household electrical appliance parts and automotive interior parts, and to a process for producing the same, said foamed thermoplastic resin molding prepared by shaping a foamed thermoplastic resin sheet, the molding comprising a general part and a thick part wherein these parts differ from each other in thickness wherein the mean expansion ratio of the thick part is not less than 1.2 times the mean expansion ratio of the general part and wherein the maximum thickness of the thick part is not less than 1.5 times the thickness of the general part.

1 Claim, 7 Drawing Sheets

FOAMED THERMOPLASTIC RESIN MOLDING AND PROCESS FOR PRODUCING THE SAME

BACKGROUND OF THE INVENTION

1. Field of the Invention

The present invention relates to foamed thermoplastic resin moldings which can be used, for example, as food product containers which can contain retort food products, etc., household electrical appliance parts and automotive interior parts, and to a process for producing the same.

2. Description of the Related Art

Foamed thermoplastic resin moldings prepared by shaping foamed thermoplastic resin sheets as a raw material resin sheet have been used in a wide range of application fields such as food product containers, household electrical appliance parts and automotive interior parts through making the excellent characteristics, such as light weight and heat insulation properties, which the moldings have. The foamed thermoplastic resin moldings used in such applications are naturally required to have certain rigidity according to their individual applications.

In general, light weight, heat insulation property and soft feeling, however, are characteristics conflicting with rigidity. In other words, to enhance the light weight, heat insulation property and soft feeling, it is necessary to make the expansion ratio of the foamed thermoplastic resin sheet to be used as the raw material resin sheet high. However, the fact is that the moldings using such highly expanded raw material resin sheets have good characteristics such as light weight, but the rigidity is deteriorated, resulting in unsatisfactory products.

As a technique for solving such problems, the invention disclosed in Japanese Unexamined Patent Publication JP-A-8-11149 is known. The technique disclosed in this publication relates to a foamed resin sheet having an expansion ratio of not less than 1.1 times and a specific gravity of not greater than 0.8 wherein a foaming condition in its one side is different from that in the other side, and to a container obtained by using the resin sheet.

Although a method for producing the foamed resin sheet is disclosed in the above-mentioned Japanese Unexamined Patent Publication JP-A-8-11149, there is no concrete description on a molding and moldings prepared by shaping according to the conventional technique for producing foamed resin containers must be unsatisfactory in rigidity.

SUMMARY OF THE INVENTION

The objects of the present invention are to provide foamed thermoplastic resin moldings which are lightweight, have heat insulation properties and soft feeling and also possess rigidity, and to provide a process for producing such moldings.

To attain the above objects, the present inventors investigated foamed thermoplastic resin moldings and a process for their production. As a result, after finding that not making the whole molding a uniform foam but imparting high heat insulation property and soft feeling to only a necessary part of the molding resulting in a foamed thermoplastic resin molding excellent in rigidity and also highly lightweight, the inventors have reached the present invention.

The foamed thermoplastic resin molding of the present invention is one prepared by shaping a foamed thermoplastic resin sheet, the molding comprising a general part and a thick part wherein these parts differ from each other in thickness wherein the mean expansion ratio of the thick part is not less than 1.2 times the mean expansion ratio of the general part and wherein the maximum thickness of the thick part is not less than 1.5 times the thickness of the general part.

Forming the general and thick parts rather than constituting the whole body of a uniform foam has resulted in the improvement of rigidity without accompanying the damage of light weight, soft feeling and heat insulation property.

The thick part is located at a position where soft feeling, heat insulation property or rigidity is required in consideration of the usage conditions of the molding.

Moreover, although the molding of the present invention is constituted essentially of such a general and thick parts, it may further have an auxiliary part which is non-foamed or of an expansion ratio lower than that of the general part, such as flanges of containers or the like, as needed.

It is preferable that the mean expansion ratio of the thick part is not less than 1.5 times and not greater than 5 times the mean expansion ratio of the general part since moldings having the greater balance of soft feeling, heat insulation property and rigidity can be prepared The foamed thermoplastic resin sheet to be used as the raw material resin sheet of the molding is preferably a foamed thermoplastic resin sheet having an expansion ratio of not greater than 5 times since moldings having the aforementioned mean expansion ratios can be certainly prepared.

The foamed thermoplastic resin sheet is preferably a foamed polyolefin-based resin sheet since moldings having required strength can be prepared at low cost.

The foamed thermoplastic resin molding of the present invention preferably further comprises a skin material layer laminated as its surface.

This results in moldings excellent in feeling to the touch and in external appearance which are particularly suitable for automotive parts applications.

The present invention provides a process for producing the aforementioned foamed thermoplastic resin molding, the process using a mold comprising a male mold member and a female mold member which can form a molding cavity corresponding to the thick part and the general part wherein each of the mold members has a pressure-reducing hole, the process comprising the following steps (1)–(4):

(1) heating step comprising softening the foamed thermoplastic resin sheet by heating it while claming and fixing its periphery with a clip;

(2) first sucking and shaping step comprising forming a molding cavity through fitting together the male and female mold members located in opposite sides of the foamed thermoplastic resin sheet by moving at least one of the mold members, and sucking through the pressure-reducing hole dug in one mold member (a first sucking mold member) of the male and female mold members, thereby shaping the foamed thermoplastic resin sheet held in the molding cavity into the shape of the first sucking mold member;

(3) second sucking and shaping comprising sucking through the pressure-reducing hole dug in the other mold member (a second sucking mold member) in parallel with or after the first sucking and shaping step, thereby forming a foamed thermoplastic resin molding; and (4) releasing step comprising removing the foamed thermoplastic resin molding after cooling.

The aforementioned production process can effectively produce foamed thermoplastic resin moldings having a general and thick parts from a foamed thermoplastic resin sheet, as a raw material resin sheet.

In the aforementioned production process, it is preferable that the process further comprises (5) expansion step comprising generating pressure difference between both sides of the softened foamed thermoplastic resin sheet, thereby causing the foamed thermoplastic resin sheet to project toward the lower pressure side, this step following the heating step wherein the first sucking and shaping step is (2') first sucking and shaping step comprising locating the male and female mold members in opposite sides of the foamed thermoplastic resin sheet so that the male mold member is in the lower pressure side, forming a molding cavity through fitting together the male and female mold members by moving the male mold member with in contact with the softened foamed thermoplastic resin sheet from its projecting side, and sucking through the pressure-reducing hole dug in one mold member (a first sucking mold member) of the male and female mold members, thereby shaping the foamed thermoplastic resin sheet held in the molding cavity into the shape of the first sucking mold member.

When expansion step (5) is added, the foamed thermoplastic resin sheet heated and softened, which is the raw material resin sheet to be molded, is uniformly expanded and stretched through the generation of differential pressure between its opposite sides, and then first sucking and shaping step (2') is executed. In this step, after fitting the male mold members having a product sharp by moving it to the male mold member side with sequentally in contact with the foamed thermoplastic resin sheet entirely heated and softened from the end portion of the mold from its projecting side, the first sucking and shaping step is executed.

In the case where a polyolefin-based foamed resin sheet is used as the foamed thermoplastic resin sheet, which is the raw material resin sheet to be molded, since it has low melt strength as distinct from amorphous foamed polystyrene resin sheets, great local elongation deformations easily occur in the vicinity of the region where the sheet touches the mold first in the production of a molding with a high drawing ratio, that is, a high ratio of the diameter of its opening to the drawing depth. This easily leads to the occurrence of defects such as the breakage of cells in the foam and the breakage of the sheet.

By the addition of such expansion step, the molding is conducted after preliminarily stretching to some extent the heated polyolefin-based foamed resin sheet with low strength. This makes deeply-drawn foamed thermoplastic resin moldings comprising a thick and general parts possible to be produced without causing such local elongation of the sheet.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step.

DETAILED DESCRIPTION OF THE INVENTION

The embodiments of the present invention will be described with reference to the accompanying drawings.

Figure 1:
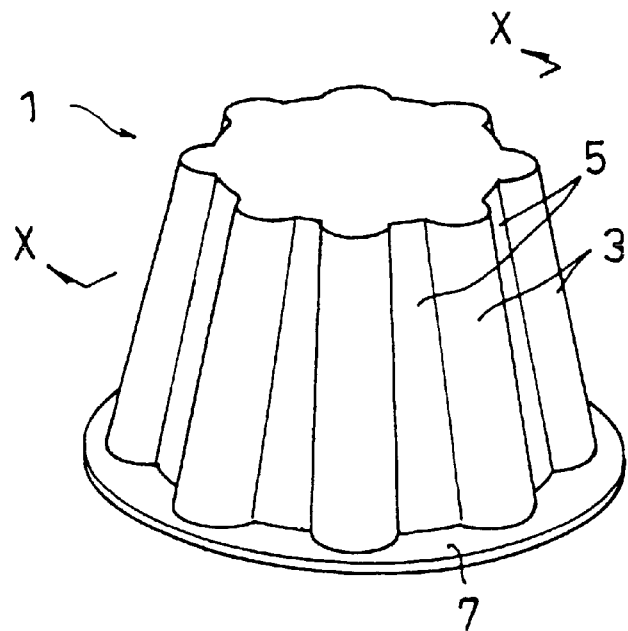
FIG. 1 includes a perspective view and section views illustrating an example of the foamed thermoplastic resin molding suitable as a food product container.
Figure 1:
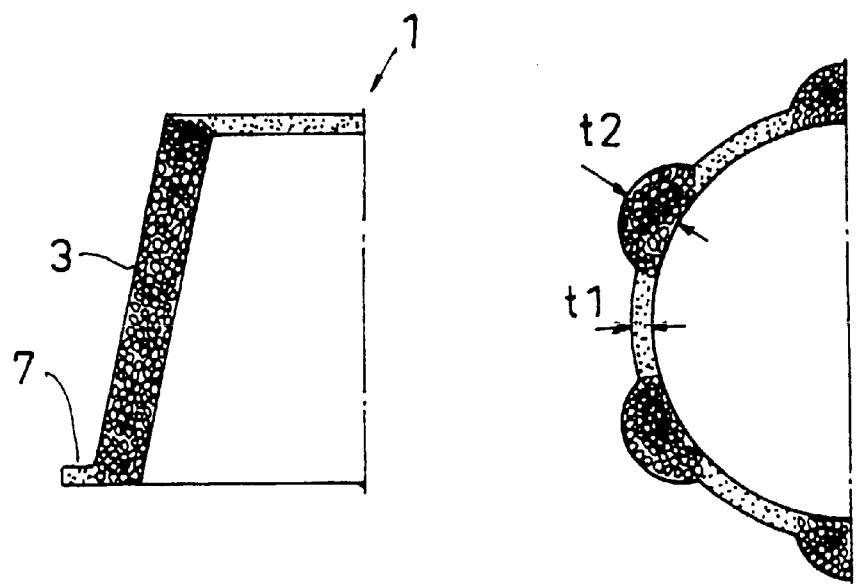

FIG. 1 illustrates a container as an example of the foamed thermoplastic resin molding of the present invention with its bottom up, in a perspective view (a), an X—X section view (b) (which is a vertical section view) and a horizontal section view (c). The foamed thermoplastic resin container 1 has a wall which is constituted of a thick part 3 and a general part 5. The thick part 3 in the form of projection and the general part 5 are formed alternately along the circumferential direction of the container wall. As a result, an effect that the compression strength in the vertical direction of the container becomes higher than that achieved in the case where the whole container is formed in a uniform thickness can be obtained. Moreover, heat insulation properties and soft feeling are achieved simultaneously because the thick part 3 with a high expansion ratio is a part which a hand touches. The thickness of the general part 5 is represented by t1 and the maximum thickness of the thick part 3 is represented by t2 in FIG. 1 (c). In the molding of the present invention, $t2/t1 \geq 1.5$ as mentioned above.

Although the thick part 3 is formed with its section approximately semicircular and its thickness continuously varies in this example, it is not limited to such a design and the section may also be a trapezoid or a rectangle. When the section is a rectangle, the thickness of the thick part 3 may vary discontinuously. The ratio of the maximum thickness t2 of the thick part 3 to the thickness t1 of the general part 5 is a ratio for adjoining parts as shown in FIG. 1 (c).

In the example of the container shown in FIG. 1, the side wall of the container constitutes the structural part of the container and the bottom part is a part with a uniform thickness which is formed in a uniform thickness. However, the bottom part may also have a general part and a thick part, and in such a case, the thick part is formed spirally, concentrically or radially In the container 1 is formed a flange 7. The flange 7 has an activity of improving strength in the radial direction of the container and also serves as a part sealed to a lid.

Figure 2:
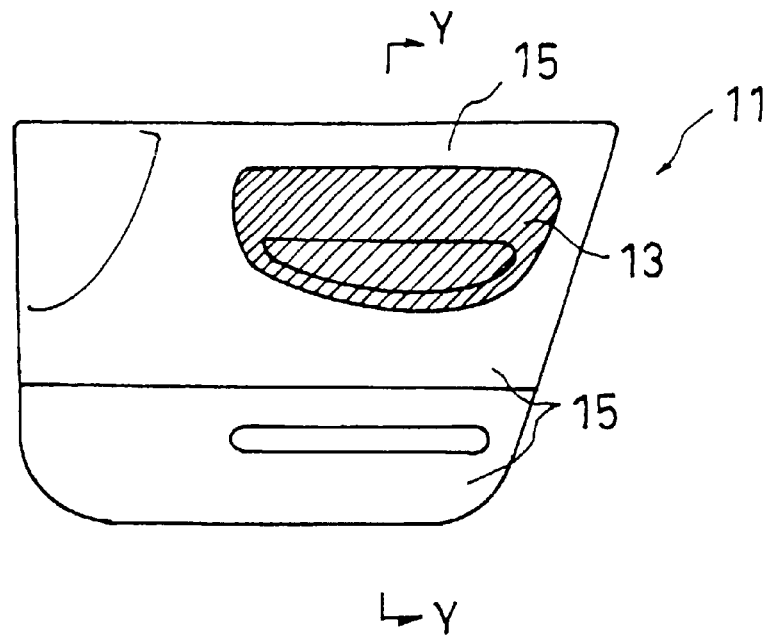
FIG. 2 illustrates a door trim as an example of a foamed thermoplastic resin molding.
Figure 2:
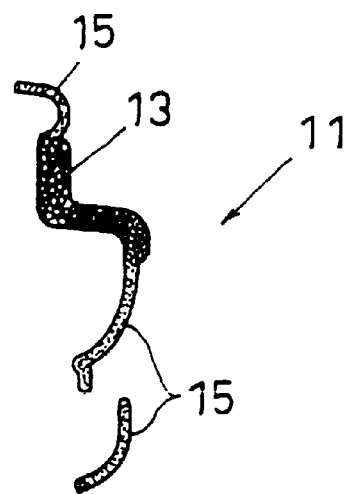

FIG. 2 illustrates a door trim as an example of the foamed thermoplastic resin molding of the present invention. The door trim 11 shown in this figure has a general part 15 and a thick part 13 near an armrest. Both rigidity and soft feeling are obtained in the vicinity of the armrest also in this example.

FIGS. 3–7 illustrate the production process of the present invention by taking the production of an container as an example.

The mold for producing containers is constituted of a male mold member 22 having a shape of an inner surface of the containers and a female mold member 21 having a shape of an external surface of the containers. The female mold member 21 has a pressure-reducing hole 24 in its molding cavity-forming surface. The male mold member 22 also has a pressure-reducing hole 25 in its cavity-forming surface. The pressure-reducing hold 24 of the female mold member 21 is connected to pressure-reducing means via a pressure-reducing branch passage 26a and a pressure-reducing passage 26b and the pressure-reducing hole 25 of the male mold member 22 is connected to pressure-reducing means via a pressure-reducing branch passage 27a and a pressure-reducing passage 27b. This can make the pressure in the molding cavity reduced, thereby performing first sucking and shaping step and second sucking and shaping step.

Figure 3:
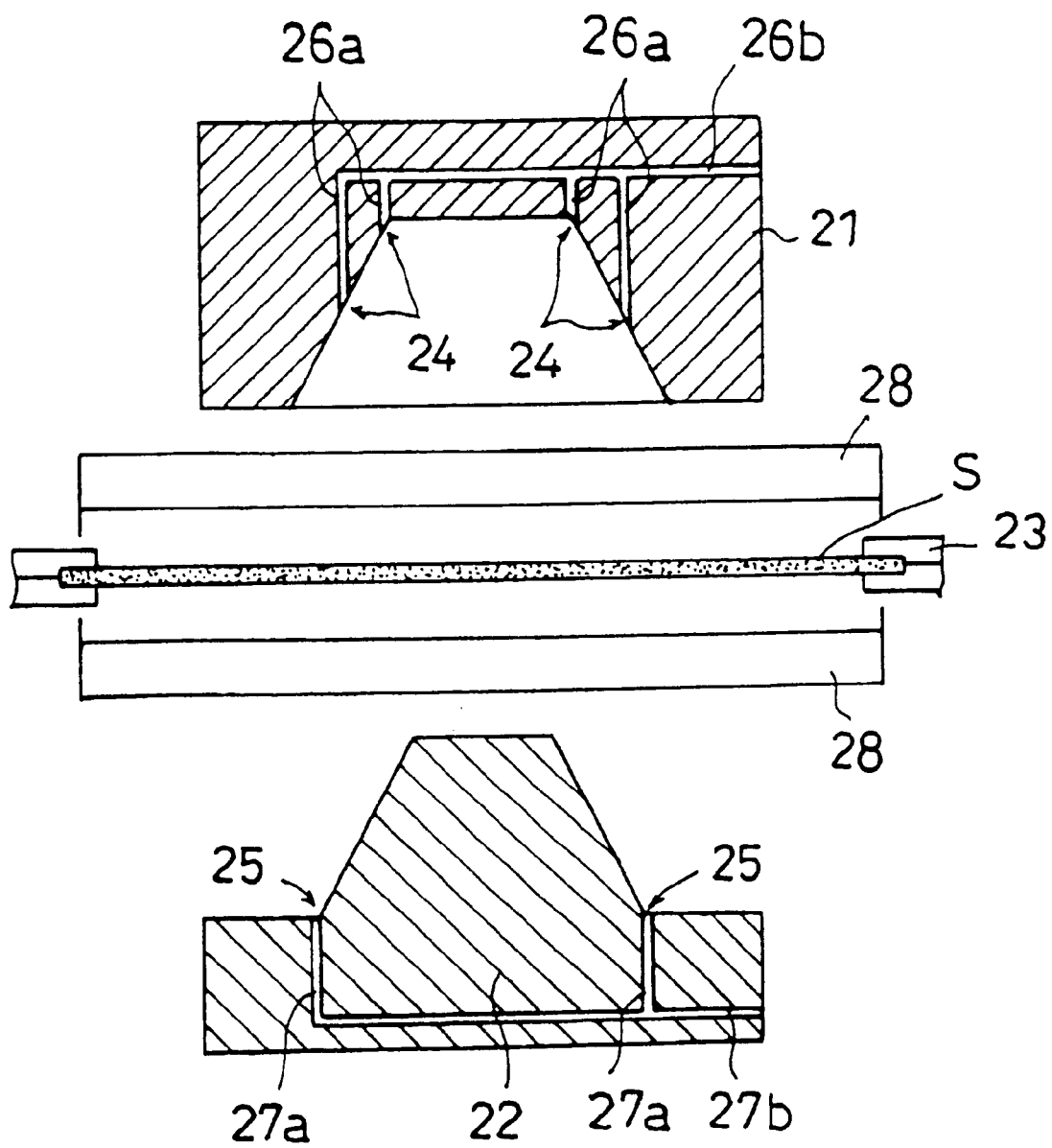
FIG. 3 is a section view illustrating an example of heating step in the process of the container production.

FIG. 3 shows heating step for heating a foamed thermoplastic resin sheet S with a heater 28 in a state where the mold is opened and the foamed thermoplastic resin sheet S, which is a raw material resin sheet, has been supplied. The foamed thermoplastic resin sheet (the raw material resin sheet) S is clamped with a clip 23 and held between the female mold member 21 and the male mold member 22. The female mold member 21 and the male mold member 22, respectively, go back to their withdrawal positions and the heater 28 advances to the vicinity of the foamed thermoplastic resin sheet S, heating the foamed thermoplastic resin sheet S from its both sides uniformly (heating step).

Figure 4:
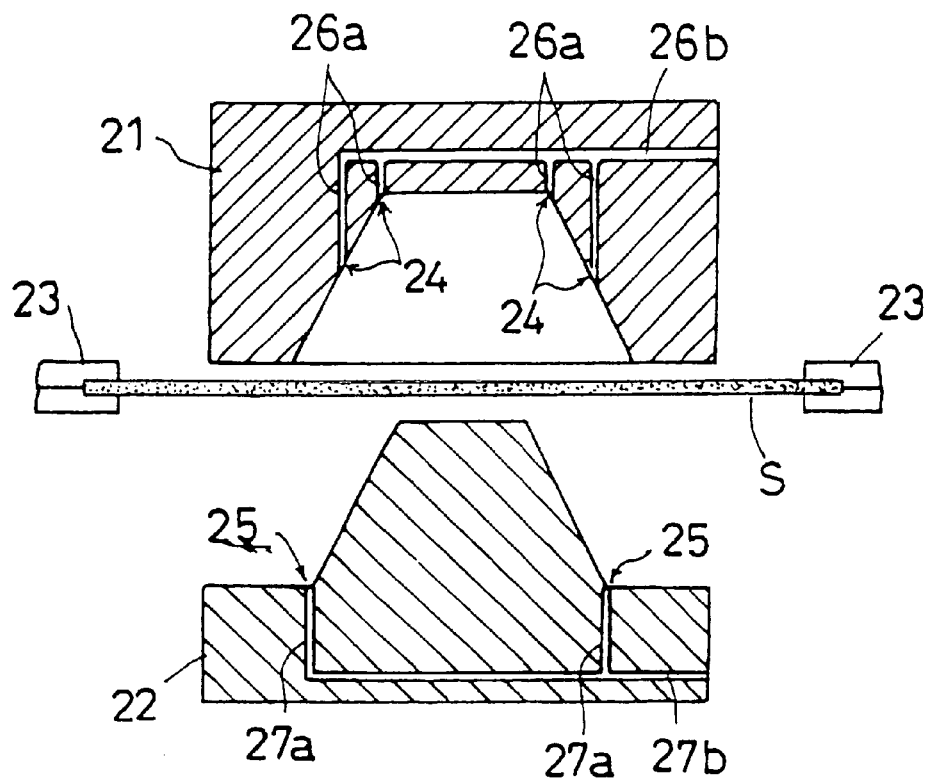
FIG. 4 illustrates a state where a male mold member and a female mold member have gotten near a foamed thermoplastic resin sheet in the process of the container production.

FIG. 4 illustrates a state where the heater 28 has moved to its withdrawal position and the female mold member 21 and the male mold member 22 have advanced to the vicinity of the foamed thermoplastic resin sheet S. The female mold member 21 may either approach close to or come in contact with the foamed thermoplastic resin sheet S.

Figure 5:
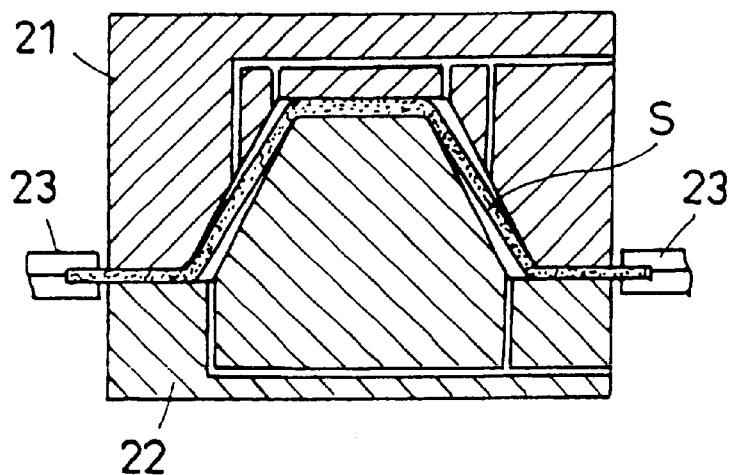
FIG. 5 illustrates a state where a molding cavity has formed with the male and female mold members fitted and with the foamed thermoplastic resin sheet placed therebetween.

FIG. 5 shows a state where the male mold member 22 and the female mold member 21 have further moved from the state shown in FIG. 4 and have fitted together, forming a predetermined molding cavity of a shape of a container. The foamed thermoplastic resin sheet S is pushed into the mold by the male mold member 22, thereby being contained in the molding cavity.

Figure 6:
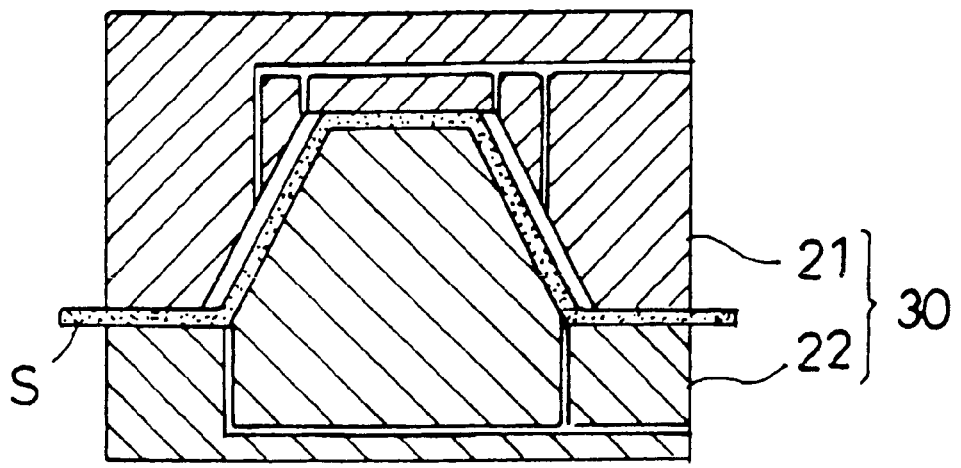
FIG. 6 illustrates first sucking and shaping step in the process of the container production.

FIG. 6 shows a state where the first sucking and shaping step has been conducted by sucking through the pressure-reducing hole 25 in the male mold member 22 with the foamed thermoplastic resin sheet contained in the mold. In this situation, the male mold member is the first sucking mold member and the foamed thermoplastic resin sheet S comes into tight contact with the male mold member 22. As a result, the shape of the inner surface of a container is formed.

Figure 7:
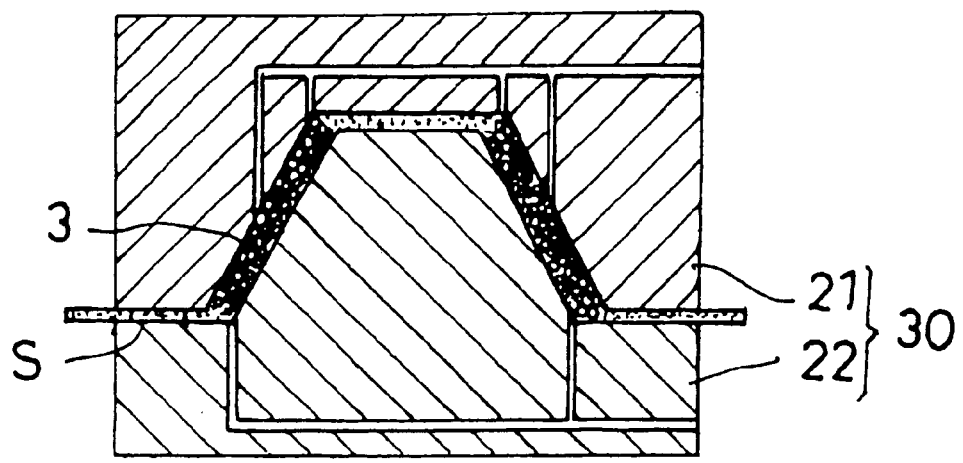
FIG. 7 illustrates second sucking and shaping step in the process of the container production.

Following the aforementioned first sucking and shaping step, FIG. 7 shows a state where the second sucking and shaping step has been conducted by sucking through the pressure-reducing hole 24 in the female mold member 21, which is the second sucking mold member in this example. In this step, a thick part 3 is formed with a higher expansion ratio than a general part and the molding of the container is completed. The first and second sucking and shaping steps may be conducted simultaneously.

After cooling, the production of the container may be completed with trimming. Another desirable embodiment is one in which the so-called cutting part is formed in a part of the mold where the flange 7 of the container 1 is formed and the trimming is conducted in parallel with the molding.

The shown in the aforementioned example is the configuration where the mold moves between its heating position and withdrawal position and the heater 28 also moves between its heating position and withdrawal position. In place of the above configuration, another configuration may be acceptable in which the foamed thermoplastic resin sheet S, which is the raw material resin sheet, is allowed to move while being clamped with the clip 23, a heating zone where the heater 28 is fixed and a molding zone where the mold is installed are formed, and the molding process shown in FIGS. 4–7 is executed in the molding zone.

Moreover, it is also possible to let the female mold member 21 be a first sucking mold member and to let the male mold member 22 be a second sucking mold member.

The clip 23 may be either one which clamps the foamed thermoplastic resin sheet S at several points, preferably at four points, or one which clamps the sheet along two sides or four sides, and may also be a clip, for example, in the form of circular or quadrangular frame. The foamed thermoplastic resin sheet may be clamped either with a single clip or with plural, the same or different clips.

The production of door trims may be conducted through the same steps shown in FIGS. 3–7 as in the above-mentioned production of containers.

In FIG. 4, the pressure-reducing holes 24 of the female mold member 21 are provided, two of them in the edge of the bottom of a container and another two of them near the center of the side wall, and two pressure-reducing holes 25 of the male mold member 22 are provided in the upper end of the side wall of the container 1. This, however, is not a limiting configuration and the pressure-reducing hole may be optionally provided depending upon the shape of containers.

Figure 8:
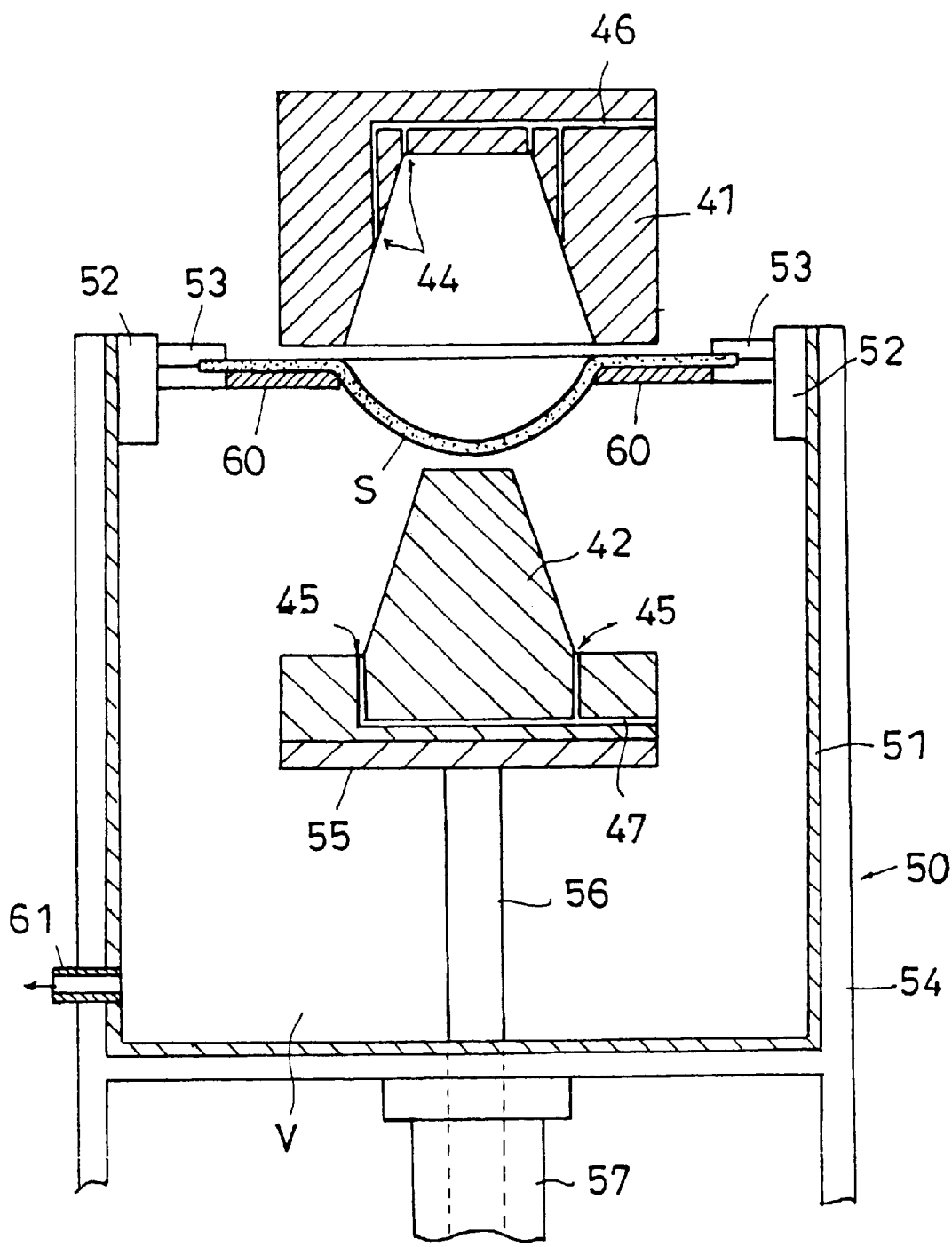
FIG. 8 illustrates the outline of a production apparatus used in the process for producing a molding, the process having expansion step, and also illustrates the expansion step.
Figure 9:
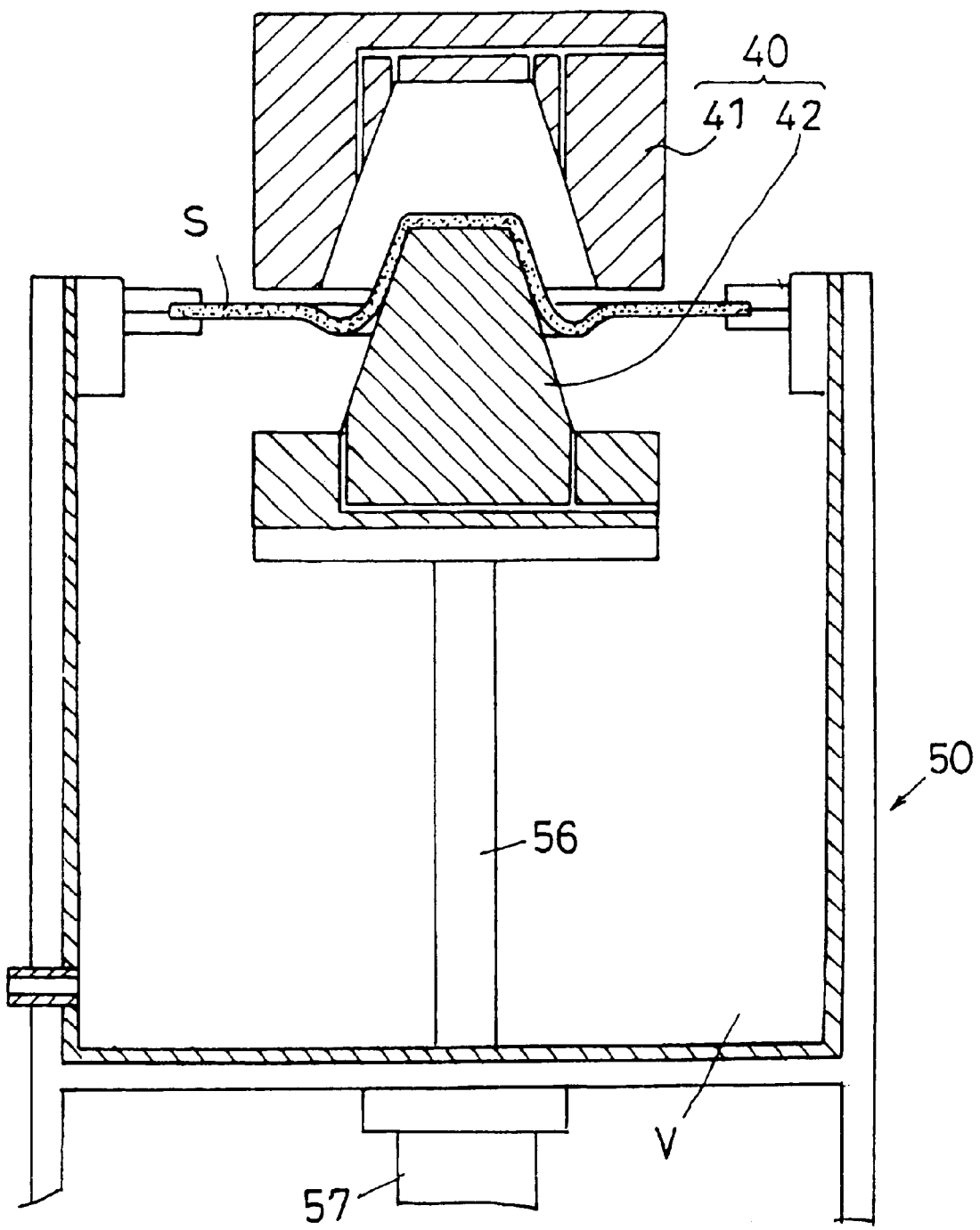
FIG. 9 illustrates the state where the male mold member is pushing a foamed thermoplastic resin sheet against the female mold member.

FIGS. 8 and 9 show the outline of a production apparatus and an example of a process for producing a foamed thermoplastic resin container where an additional expansion step is executed following heating step. In this example, expansion step is conducted by expanding a foamed thermoplastic resin sheet through reducing pressure.

The production apparatus 50 to be used in the production process having expansion step has a box 51 for forming a vacuum chamber V and a frame 54 for supporting the box 51. A mold constituted of a female mold member 41 and a male mold member 42 which are the same as those shown in FIG. 4 is installed so that the male mold member 42 is located in the vacuum chamber V and the female mold member 41 is positioned outside the vacuum chamber. The male mold member 42 is fixed onto a mold support base 55 and the mold support base 55 is mounted to a rod 56 of a hydraulic cylinder 57 installed to the frame 54.

The foamed thermoplastic resin sheet S is clamped with a clip 53 that is freely opened and closed by an open and close member 52. An expanding part of the foamed thermoplastic resin sheet S is controlled by a frame 60 so that only a part, which is necessary for molding, of the sheet necessary for molding is expanded. The shape of the expanding part defined by the frame 60 is not particularly limited and is determined in consideration with the shape of moldings and the like. It is preferably a circle when truncated corn-shaped containers, such as containers for noodles-in-cup, are produced.

Like the case shown in FIG. 4, the foamed thermoplastic resin sheet S is clamped with the clip 53. The clamping makes the vacuum chamber closed. When the inside of the vacuum chamber V is depressurized, the foamed thermoplastic resin sheet S, which has been heated and softened, is expanded and projects.

In heating step, the heater 28 is forced to go forward with the mold withdrawn in the same manner as shown in FIG. 3, thereby heating the foamed thermoplastic resin sheet S uniformly.

After heating, when the inside of the vacuum chamber V is vacuumed through a pressure-reducing hole 61 of the vacuum chamber with a vacuuming apparatus (not shown), the part not controlled by the frame 60 is expanded and projects toward the male mold member 42. When, in this state, the male mold member 42 is moved toward the female mold member 41, the male mold member 42 comes into contact with the expanded and projecting foamed thermoplastic resin sheet S from its top and the male mold member 42 moves toward the female mold member 41. Through such operations, the expanded and projecting foamed thermoplastic resin sheet S is made contact and covers the male mold member 42 just like a cloth covers the mold member, thereby being contained in the molding cavity. Accordingly, any local elongation does not occur and the molding of containers becomes possible.

Moreover, although the above-mentioned expansion step (2) may be conducted in the manner that a pressurizing chamber is provided in the side of the female mold member 41 in FIG. 8 and the pressurizing is conducted by the use of the pressurizing chamber, it is preferably conducted in the manner that one side of the foamed thermoplastic resin sheet S is maintained at atmospheric pressure and the other side is reduced pressure. According to the preferable manner, the reducing pressure makes it possible to adjust a slight pressure difference easily, and as a result, a delicate adjustment of the projection height of the softened foamed thermoplastic resin sheet can be done more precisely than by pressurizing.

In the above-mentioned expansion step, it is preferable that the projection height of the foamed thermoplastic resin sheet is not less than 50% of the height of the projecting section of a molding, and specifically in the case where the molding is a container, it is not less than 50% of the height of the container.

By setting the projection height of the foamed thermoplastic resin sheet S at not less than 50% of the height of the projecting section of a molding, the local elongation of the raw material resin sheet, which particularly caused in the part which forms the side wall of a molding, can be effectively suppressed and it becomes possible to more easily produce deeply-drawn foamed polyolefin-based resin containers with draw ratios of 0.6 or more. A draw ratio is a ratio of the diameter of an opening to the height of the projecting section. In the case of truncated corn-shaped containers, the ratio (the height of a container/the diameter of the opening of the container) is the draw ratio. Moreover, a projection height is a distance from the level where the expanded and projecting foamed thermoplastic resin sheet is clamped with a clip 23 to the top of the resin sheet.

When providing a skin material layer in a molding, it is possible to conduct molding by, for example, overlapping the foamed thermoplastic resin sheet S and a skin material and clamping them with the clip 23 in the situation depicted in FIG. 4 and performing the steps shown in FIGS. 5–7 to produce laminated moldings. It is also possible to conduct molding by, for example, laminating a foamed thermoplastic resin sheet and a skin material in advance and clamping the resulting laminated sheet with the clip 23 in the situation depicted in FIG. 4 and performing the steps shown in FIGS. 5–7 to produce laminated moldings.

The foamed thermoplastic resin molding of the present invention may be employed for food product containers, household electrical appliance parts and automotive interior parts, specific examples of the automotive interior parts including instrument panels, seat backs, partition boards, console boxes and door trims.

As the foamed thermoplastic resin sheet to be used in the present invention, any resin sheet which has been conventionally used in the above-mentioned applications may be used. Furthermore, polyolefin-based resin sheets such as foamed polyopropylene-based resin sheets and foamed polyethylene-based resin sheets, are desirably used and foamed polypropylene-based resin sheets are more preferably used from the viewpoints of moldability, cost, physical strength and so on.

The foamed polypropylene-based resin sheet may be any one as long as it is a polypropylene-based foam having an expansion ratio of not less than 1.5 times and not greater than 5 times. Commercially available foamed thermoplastic resin sheets, for example, SUMICELLER (available from Sumika Plastech Co., ltd.) may be used. The polypropylene-based resin of the foamed polypropylene-based resin sheet may contain other mixed resin components, copolymerized components and the like as long as it contains polypropylenes as the main resin component.

As the process for producing the foamed polypropylene-based resin sheet, one comprising mixing a thermally decomposable foaming agent and a polypropylene resin, kneading and homogenizing the resin and the foaming gas while performing the heating and melting of the resin and the decomposition of the foaming agent in an extruder, cooling down to a temperature suitable for foaming, then extruding the resulting matter into a sheet through a die to foam it, and cooling and shaping with a take-up machine, and one comprising charging a physical foaming agent in place of the thermally decomposable foaming agent under pressure, then extruding the resulting matter into a sheet through a die to foam it, and cooling and shaping with a take-up machine, may be adopted. Such processes are disclosed in, for example, Japanese Patent Publication No. 58-31098 and the like. The adjustment of an expansion ratio may be done through the adjustment of the kind and quantity of the foaming agent.

To obtain the aforementioned foamed thermoplastic resin sheet in which a skin material layer is laminated may be employed, for example, a method comprising heating and melting the surface of a foamed thermoplastic resin sheet extrusion-molded at a certain expansion ratio and laminating it with a separately-supplied skin material with a compression roll and a method comprising adhering and laminating a foamed thermoplastic resin sheet and a skin material after applying adhesive to the surface of the foamed thermoplastic resin sheet.

As the skin material to be used in the present invention may be used any skin material which has been conventionally used for the production of laminated moldings. Specific examples of such a skin material include woven fabrics, non-woven fabrics, knitted fabrics, films and sheets made of thermoplastic resins or thermoplastic elastomers. Moreover, composite skin materials in which non-foamed or foamed sheet made of polyurethane, rubber, thermoplastic elastomer or the like are laminated to those skin materials may be also used.

What is claimed is:

1. A process for producing a foamed thermoplastic resin molding that comprises a general part and thick part wherein such parts differ from each other in thickness, the mean expansion ratio of the thick part is not less than 1.2 times the mean expansion ratio of the general part, and the maximum thickness of the thick part is not less than 1.5 times the thickness of the general part, the process using a mold comprising a male mold member and a female mold member which can form a molding cavity corresponding to the thick part and the general part wherein each of the mold members has a pressure-reducing hole, the process comprising:

(1) a heating step comprising softening a foamed thermoplastic resin sheet by heating it while clamping and fixing its periphery with a clip;

(2) an expansion step comprising generating a pressure difference between both sides of the softened foamed thermoplastic resin sheet, thereby causing the foamed thermoplastic resin sheet to project toward the lower pressure side, this step following the heating step;

(3) a first sucking and shaping step comprising locating the male and female mold members on opposite sides of the foamed thermoplastic resin sheet so that the male mold member is on the lower pressure side, forming a molding cavity by fitting together the male and female mold members by moving the male mold member in contact with the softened foamed thermoplastic resin sheet from its projecting side, and sucking through the pressure-reducing hole in one mold member, as a first sucking mold member, of the male and female mold members, thereby shaping the foamed thermoplastic resin sheet held in the molding cavity into the shape of the first sucking mold member;

(4) a second sucking and shaping step comprising sucking through the pressure-reducing hole in the other mold member, as a second sucking mold member, simultaneously with or after the first sucking and shaping step, thereby forming a foamed thermoplastic resin molding; and (5) a releasing step comprising removing the foamed thermoplastic resin molding after cooling.

* * * * *